Dec. 30, 1947.  J. NOVAK  2,433,622

PERFORATED CONTAINER FOR TAMALES

Filed May 24, 1943

Inventor
J. NOVAK.

By Lester B. Clarke.

Attorney

Patented Dec. 30, 1947

2,433,622

UNITED STATES PATENT OFFICE 2,433,622

PERFORATED CONTAINER FOR TAMALES

Joseph Novak, San Antonio, Tex.

Application May 24, 1943, Serial No. 488,145

4 Claims. (Cl. 99—109)

1

The invention relates to a perforated container or wrapper for tamales in combination with the acceleration of the cooking of the tamale due to the perforations or openings in the wrapper so as to improve the flavor and digestibility of the tamale.

In the usual process of cooking tamales, the body of the tamale is formed of suitable ingredients and then enclosed in a wrapper. These wrappers as a general rule are a shuck or part of a corn husk trimmed to the proper size in which the body of tamale material is then wrapped. In some instances the wrapper is of sufficient length to fold over the ends of the material. In other instances the wrapping is made on a bias so as to confine the ends, while in still other instances the ends are tied tightly.

After the tamale is thus made up it is steamed or otherwise cooked for a sufficient period of time for the heat to penetrate the wrapper and cook the tamale material. It has been found however that if heat is applied to the tamale for a sufficient length of time to permit penetration of the heat thoroughly through the wrapper and the tamale material that a considerable amount of the starches in the tamale are hardened due to the extended period of heat application and that a considerable amount of the natural flavor is cooked out of the tamale.

The present invention, therefore, contemplates an improvement by the provision of perforations or openings in the wrapper which will permit the entry of the heat and the cooking fluids so that the starches of the tamale are not subjected to heat for an excessive period which results in a dryness and loss of flavor, but to the contrary, the steaming or cooking can be carried on for the shortest possible time to permit cooking of the material within the wrapper.

It is therefore one of the objects of the present invention to provide a method of accelerating the cooking of tamales.

Another object of the invention is to provide a tamale wrapper with perforations.

Another object of the invention is to improve the flavor and digestibility of tamales by perforating the wrapper to accelerate the cooking thereof.

Another object of the invention is to provide openings or perforations in the tamale wrapper.

Other and further objects of the invention will be readily apparent when the following description is considered in connection with the following drawings wherein Fig. 1 is a plan view of a tamale wrapper showing perforations therein of a specific pattern.

2

Figure 1:
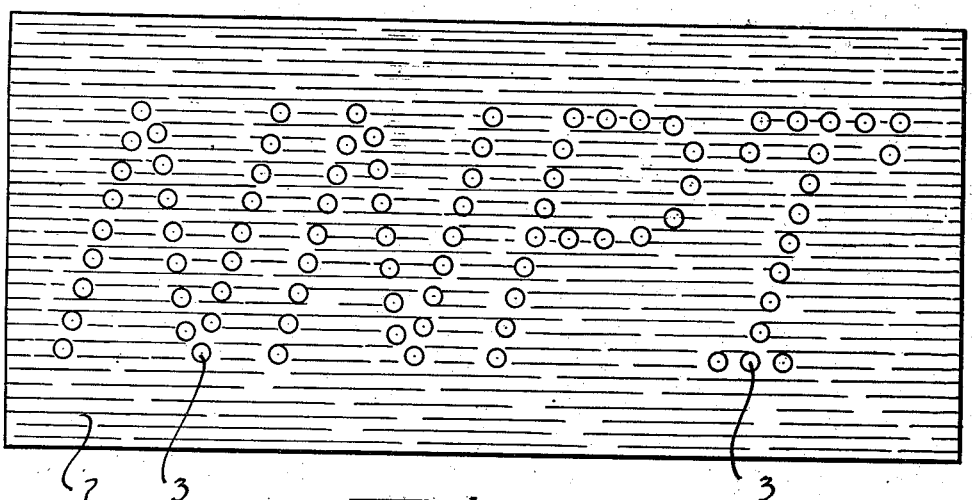

The invention will be practiced by providing a wrapper such as 2 of Fig. 1 with a plurality of perforations or openings 3.

Figure 3:
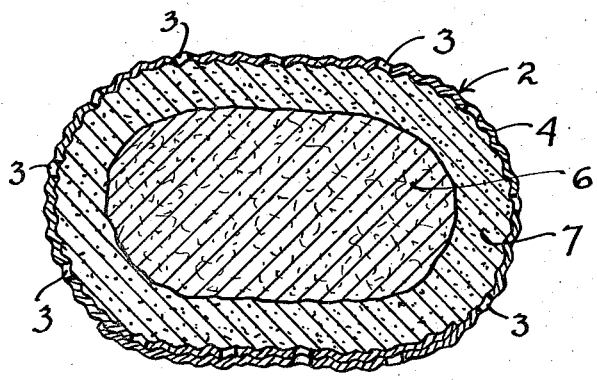
Fig. 3 is an enlarged sectional view taken on the line 3—3 of Fig. 2.

The wrapper 2 may be made of any desired material, such for instance, as a natural corn shuck or leaf of a corn husk. These leaves or shucks are sometimes known as "bracts." The shuck will usually be trimmed to a slightly larger confiiguration than the length of the tamale and of a width to wrap from 1½ to 2 times around the tamale material. The corn shuck is usually of a wrinkled or irregular configuration as seen at 4 in Fig. 3. The perforations 3 may be made of any desired number, pattern, size or configuration, the principal feature being to permit the ingress and egress of the cooking fluids so as to speed up the cooking operation and thus improve the flavor and digestibility of the tamale. In Fig. 1 the perforations have been provided in the form of the letters NNPT representing "Novak's New Processed Tamales."

Figure 2:
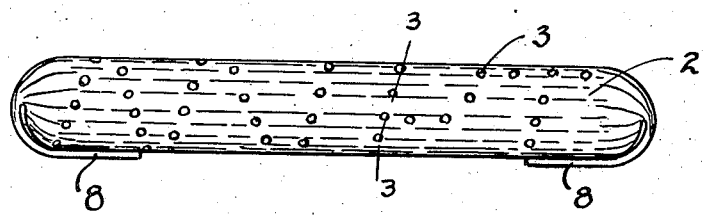
Fig. 2 is a side elevation of a tamale contained in a perforated wrapper.

A tamale is usually formed by having a center portion 6 of meat, which center portion is enclosed by a covering 7 of corn meal with other ingredients added such as spices, flavoring, etc. This body of material made up of the meat center 6 and the corn meal covering 7 is then enclosed in the wrapping 2 somewhat in the manner shown in section in Fig. 3. The ends 8 of the wrapping may then be folded over as shown in Fig. 2. They may be tied at the end of the tamale with a string or thread, or in some instances the tamale material is wrapped on a diagonal with the ends of the wrapper folded in.

As an illustration of actual use the perforations 3 may approximate $\frac{3}{16}$" in diameter and the letters are about 2½" in heighth. The spacing of the perforations may be as desired in order to obtain the shortest possible cooking time. While the perforations have been shown in the form of letters, it is to be distinctly understood that they may be either uniformly or irregularly arranged in the wrapper as desired. It is to be understood also that any suitable wrapping material may be used, but for many years a corn shuck has been the preferred wrapper because of the flavor which it imparts to the tamale.

The word "perforations" has been used as defining the openings 3 and perforations are preferred because a perforation removes a small portion of the wrapping material and affords greater access to the tamale material than would mere punchings or other types of openings formed in the tamale. It is not intended, however, to limit the present invention to the actual perforation because it has been found that openings may be suitable.

In practicing the invention the tamale center 6 of meat will be made up in a suitable size, it will then be coated with the corn meal covering 7, the wrapper 2 will have been provided with the openings 3 and the tamale body is then wrapped. The cooking operation is performed by steaming or otherwise subjecting the tamale to heat. The provision of the openings reduces the period of heating so as to amply cook the starches in the tamale material and to also cook the meat center, but to avoid dryness and loss of flavor due to an extended period of cooking.

Broadly the invention contemplates the provision of openings in a tamale wrapper.

What is claimed is:

1. A method of preparing and cooking tamales which includes the steps of forming the body of tamale material, providing a corn husk with a series of perforations therethrough, enclosing the material in the perforated shuck, and immersing the tamale thus formed in the cooking fluids so that such fluids will permeate the shuck through the perforations and improve the flavor of the tamale.

2. A method of improving the flavor and digestibility of tamales composed of meat enclosed in a starchy cereal which comprises the steaming of the tamale and the provision of perforations in the tamale wrapper to facilitate the entry of steam and the uniform cooking of the starches of the tamale while avoiding the steaming for an extended period of time which tends to harden the starches.

3. A method of improving the flavor and digestibility of tamales composed of a meat center and an enclosing layer of a starchy cereal which comprises providing a tamale wrapper having a plurality of spaced perforations therein, immersing the tamale in a cooking fluid, cooking the tamale in a minimum period due to the ingress of the cooking fluids through the perforations prior to the release of the starches.

4. An article of manufacture comprising a tamale consisting of a body of meat, an enclosing covering of starchy cereal, a corn husk wrapped about the cereal, said corn husk having a plurality of perforations therethrough to allow for a flow of cooking fluids into and out of the husk so as to facilitate the cooking of the starchy cereal.

JOSEPH NOVAK.

REFERENCES CITED

The following references are of record in the file of this patent:

UNITED STATES PATENTS

| Number | Name | Date |
| --- | --- | --- |
| 1,261,412 | Lewites | Apr. 2, 1918 |
| 1,890,215 | DeCressey | Dec. 6, 1932 |
| 2,136,106 | Kern | Nov. 8, 1938 |
| 1,706,225 | Goldberg | Mar. 19, 1929 |
| 1,062,969 | Harrison | May 27, 1913 |
| 1,245,031 | Roeding | Oct. 30, 1917 |

OTHER REFERENCES

Everybody's Cook Book by Lord, 1924, page 494. (Copy in Div. 63, U. S. Patent Office.)